(12) United States Patent
Lengsfeld et al.

(10) Patent No.: US 8,545,659 B2
(45) Date of Patent: Oct. 1, 2013

(54) METHOD FOR PRODUCING A T-STRINGER

(75) Inventors: Hauke Lengsfeld, Helmste (DE); Christian Luebbering, Gruenendeich (DE)

(73) Assignee: Airbus Operations GmbH, Hamburg (DE)

( * ) Notice: Subject to any disclaimer, the term of this patent is extended or adjusted under 35 U.S.C. 154(b) by 616 days.

(21) Appl. No.: 12/667,780

(22) PCT Filed: Jun. 17, 2008

(86) PCT No.: PCT/EP2008/057608
§ 371 (c)(1),
(2), (4) Date: Apr. 22, 2010

(87) PCT Pub. No.: WO2009/010357
PCT Pub. Date: Jan. 22, 2009

(65) Prior Publication Data
US 2010/0200156 A1    Aug. 12, 2010

Related U.S. Application Data

(60) Provisional application No. 60/959,377, filed on Jul. 13, 2007.

(30) Foreign Application Priority Data

Jul. 13, 2007   (DE) .......................... 10 2007 032 819

(51) Int. Cl.
*B32B 38/10*    (2006.01)
*B29C 70/46*    (2006.01)

(52) U.S. Cl.
USPC ............................. 156/226; 156/247; 156/289

(58) Field of Classification Search
None
See application file for complete search history.

(56) References Cited

U.S. PATENT DOCUMENTS 4,287,263 A * 9/1981 Woodring et al. ............. 428/489
6,315,759 B1 * 11/2001 Peterson ........................ 604/171
(Continued)

FOREIGN PATENT DOCUMENTS

EP    1481790    12/2004

OTHER PUBLICATIONS

Paolo Ermanni, "CFK-Rumpf in Nasswickel- und Prepregtechnik", *Composites Technologien*, Nov. 30, 2005.

(Continued)

*Primary Examiner* — Barbara J. Musser
(74) *Attorney, Agent, or Firm* — Greer, Burns & Crain Ltd.

(57) ABSTRACT

The present invention provides a method as well as a tool (1, 48) for producing a T-stringer, in particular in the aircraft and spacecraft sector. The method is characterized by two lay-up strips (3, 4) being arranged on top of one another, wherein areas (5, 6) of the lay-up strips (3, 4) corresponding to the stringer foot (60) that is to be formed, are spaced apart from one another by means of separation films (7, 8) and areas (14, 15) of the lay-up strips (5, 6) corresponding to a stringer web (61) come into direct contact with one another, in particular, forming a material bond. In a further method step, the lay-up strips (3, 4) are clamped at the areas (14, 15) corresponding to the stringer web (61) that is to be formed. In an even further step, the areas (5, 6) corresponding to the stringer foot (60) that is to be formed are folded open in opposite directions (28, 29) by means of a folding-open mandrel (25), and by means of a pressing roller (37) the areas (5, 6) are pressed against corresponding pressing surfaces (23, 24) of the clamping device (1) such that the areas (23, 24) are properly flush. Finally, the folded lay-up strips (3, 4) are cured to form the T-stringer that is to be produced. The method according to the invention has the advantage over the known method for producing T-stringers that a smaller number of steps is required to produce the T-stringer and can be automated easily.

6 Claims, 5 Drawing Sheets

(56) References Cited

U.S. PATENT DOCUMENTS 6,730,184 B2  5/2004  Kondo et al.
7,141,199 B2  11/2006 Sana et al.

OTHER PUBLICATIONS

Paolo Ermanni, "Skript zur ETH-Vorlesung", *Composites Technologien*, Aug. 2007.

* cited by examiner

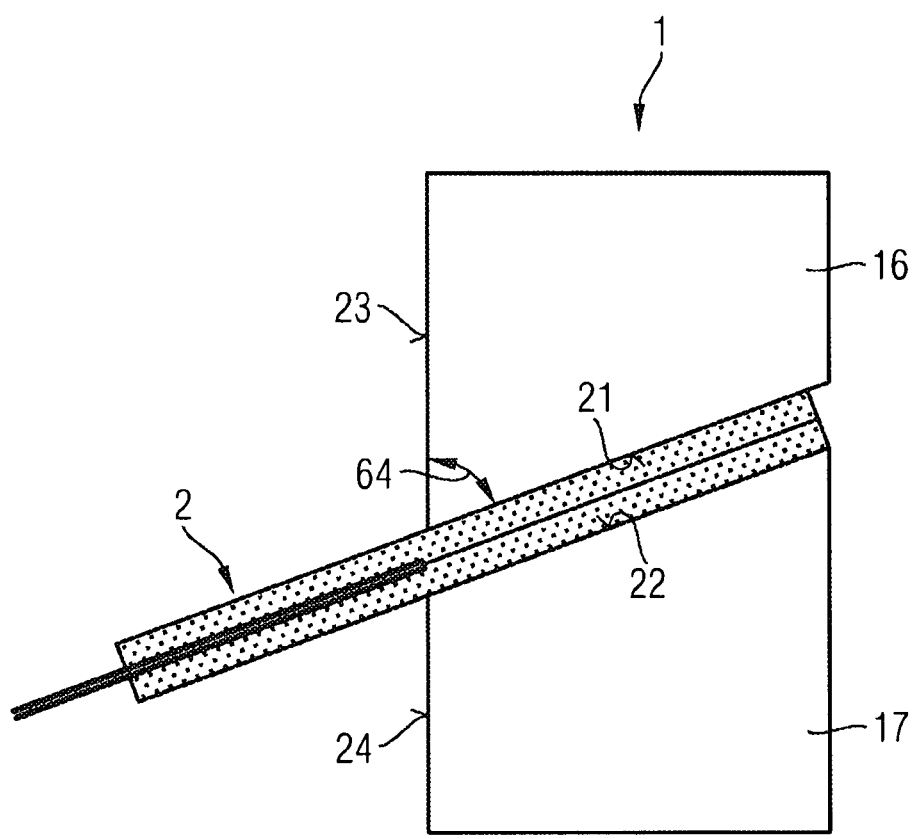

METHOD FOR PRODUCING A T-STRINGER

The present invention relates to a method and a tool for producing a T-stringer, in particular in the aircraft and spacecraft sector.

A plurality of methods for producing T-stringers is commonly known. In one such method, lay-up strips are hot formed into L-profiles and, in a further step, two L-profiles at a time are connected at their legs in order to form a T-profile. The T-profiles are cured to form T-stringers thereafter. This process is characterized by a plurality of manual steps, which is costly in terms of time and money.

It is therefore one objective of the present invention to provide an improved method and/or an improved tool for producing T-stringers.

SUMMARY OF THE INVENTION

Accordingly, there is provided a method for producing a T-stringer, in particular in the aircraft and spacecraft sector, comprising the following steps. Initially, a first and a second lay-up strip are provided. Thereafter, a first separation film is positioned onto an area of the first lay-up strip corresponding to a stringer foot of the T-stringer that is to be formed, wherein the first separation film borders on an edge of the first lay-up strip. In a further step, a second separation film is positioned onto an area of the second lay-up corresponding to the stringer foot, wherein the second separation film borders on an edge of the second lay-up strip. In a further step, the second lay-up strip is positioned onto the first lay-up strip such that an area of the second lay-up strip corresponding to a stringer web of the T-stringer that is to be formed lies against an area of the first lay-up strip corresponding to the stringer web and that the first and second separation film lie against each other. Hereafter, the areas of the first and second lay-up strip corresponding to the stringer foot that is to be formed are folded open in opposed directions. Then, the first and second lay-up strip are at least partially cured to produce the T-stringer.

Further, a tool for producing a T-stringer, in particular in the aircraft and spacecraft sector, comprising a clamping device and a folding-open mandrel is provided. The clamping device is configured for clamping of areas of a first and second lay-up strip, which correspond to a stringer web of the T-stringer that is to be formed and which lie against each other. The folding-open mandrel can be moved relative to the clamping device for folding areas of the first and second lay-up strip, which correspond to a stringer foot of the T-stringer that is to be formed and which project from the clamping device.

The present invention is based on the idea that two lay-up strips that lie on top of each other can be partially folded in order to produce a T-stringer in a simple manner. The separation films serve as a positioning aid, in particular for the folding-open mandrel, on the one hand, and, on the other hand, they allow, in particular when using lay-up strips made of prepreg material, a simple partial folding of the same because, without the separation films, the lay-up strips would stick to one another due to the matrix inside them and/or the folding-open mandrel would resinify and become unusable thereby.

In comparison to the known method for producing a stringer, the method according to the present invention can be automated very easily and the method according to the present invention is characterized by a smaller number of method steps.

The dependent claims describe advantageous embodiments of the present invention.

By the first and/or the second separation film bordering on an edge of the first and/or second lay-up strip, it is, in particular, also meant that the first and/or second separation film project past the edge of the first and/or second lay-up strip. A "pure" bordering is the limit state, in which it is for the folding-open mandrel just yet possible to safely enter between the first and second separation foil.

According to a preferred embodiment of the present method, the areas of the first and second lay-up strip, which correspond to the stringer web that is to be formed and which lie against each other, are clamped in a clamping device, wherein the areas of the first and second lay-up strip corresponding to the stringer foot project from the clamping device and, thereafter, a folding-open mandrel is inserted between the first and second separation film for folding the areas of the first and second lay-up strip corresponding to the stringer foot open in opposed directions. By clamping the areas corresponding to the stringer web that is to be formed, the first and second lay-up strip can be handled very easily. It is preferred to exert a high pressure on the clamped areas during clamping such that a material bond is produced and/or the areas come to lie very close to each other. The folding-open mandrel is preferably entered in a direction transversal to the lay-up strips between the first and second separation film and, therein, forces apart the areas corresponding to the stringer foot that is to be formed. When the folding-open mandrel is, thereafter, moved further in the transversal direction of the lay-up strips, then a folding of the lay-up strips is achieved (i.e. a fold is produced, meaning a local bending of the lay-up strips in their transversal direction). Then, the areas of the first and second lay-up strip corresponding to the stringer foot have an angle of preferably approximately 90 degrees with respect to the areas corresponding to the stringer web that is to be formed. Thereafter, the folding-open mandrel is preferably moved in the longitudinal direction of the lay-up strips, because depending on the material and/or length of the lay-up strips, these can only be folded over locally (with respect to the longitudinal direction of the lay-up strips) and not along their entire length by means of the movement of the folding open mandrel in the transversal direction. The method step according to this embodiment is kinematically easy to realize and is therefore very well suited to an automation.

According to a further preferred embodiment of the method according to the present invention, the areas of the first and second lay-up strip, which correspond to the stringer foot that is to be formed and which are folded open, are pressed, in particular by means of a pressing roller moving in the longitudinal direction of the lay-up strips, against a surface of the clamping device, respectively, and lay flush with respect to each other. Depending on the material of the lay-up strips, it may, in order to produce the areas corresponding to the stringer foot such that they are properly aligned and/or lie flush, be necessary to press these between two substantially flat surfaces, preferably embodied by the surfaces of the clamping device and the pressing roller, wherein the area of the lay-up strips corresponding to the stringer foot that is to be formed lie in a single plane between the two flat surfaces.

According to a further preferred embodiment of the method according to the present invention, directly after the folding open or after the pressing against the surfaces of the clamping device, the first and second separation film are removed. Since the separation films are not being used anymore after the steps previously described, these separation films should be removed in order to prevent a curing of these together with the first and second lay-up strip.

According to a further preferred embodiment of the method according to the present invention, the areas of the first and second lay-up strip, which correspond to the stringer foot that is to be formed and which are folded open, are machined, in particular cut, prior to the at least partial curing. Due to the folding open of the areas corresponding to the stringer foot that is to be formed, these areas exhibit a so-called "book effect". By the book effect, a movement of individual layers inside the areas that have been folded open is meant, similar to the pages of an open book. While still in a soft state, the areas affected by the book effect can be easily machined. This is in particular also because the areas corresponding to the stringer web are clamped in the tool and this results in an easy handling of the first and second lay-up strip in the state where they are folded open.

According to a further preferred embodiment of the method according to the present invention, the first and second lay-up strip are provided as prepreg material (i.e. fiber material that has been preimpregnated with a matrix, for example epoxy resin) and/or dry fiber preforms (fiber material without a matrix). Presently, a fiber lay-up means any type of fiber lay-up or fiber mesh. Preferably, it is a lay-up, wherein the orientation of the fibers has been optimized in accordance with the later usage of the T-stringers. Preferably, the lay-up strips are produced by means of a tape laying method and do therefore comprise one or more layers of tape. "Tape" presently and preferably means unidirectional fiber lay-ups that have been impregnated with a resin matrix.

Generally, it is preferred to apply heat to the lay-up strips prior to folding them open in order to ensure a plastic deformation of the same.

Preferably the first and second lay-up strip are provided in a material state such that they exhibit a sufficient stability in shape such that a clamping of the first and second lay-up strip whilst the areas corresponding to the stringer feet that are to be formed project, does not result in the first and second lay-up strip deforming merely due to gravity in particular where the areas of the first and second lay-up strip project past the tool.

In a further preferred embodiment of the method according to the present invention, the dry fiber preform, in particular including a binder, is impregnated with a resin matrix after the folding open, wherein, in particular, heat is supplied for melting the binder for a plastic deformation of the fiber preform during folding. This can, for instance, be done by means of a vacuum infusion method. Hence, dry fiber preforms can also be processed into T-stringers in a simple manner.

According to a preferred embodiment of the tool according to the present invention, the tool is provided with a pressing roller, by means of which the areas of the first and second lay-up strip, which correspond to the stringer foot that is to be formed and which are folded open, can be pressed against surfaces of the clamping device for lying flush with respect to each other. As already described above, thereby, a proper alignment and/or a lying flush of the areas of the first and second lay-up strip corresponding to the stringer foot that is to be formed can be ensured.

According to a further preferred embodiment of the tool according to the present invention, the tool has two rotatable, cylindrical areas on one axis, wherein the folding of a mandrel is positioned between the rotatable, cylindrical areas. Thereby, a kinematic unit can be provided, which allows for the folding open as well as for the pressing of the areas corresponding to the stringer foot that is to be formed against the surfaces of the clamping device. Hence, the design of the tool is substantially simplified and controlling complexity is also reduced.

According to a further preferred embodiment of the tool according to the present invention, the folding-open mandrel has a shape which tapers in a concave manner along its direction of insertion between the areas of the first and second lay-up that correspond to the stringer foot. Initially, such a folding-open mandrel allows for a safe insertion of the same between the first and second separation film. Thereafter, the concave surfaces act as guiding means, which guide the areas corresponding to the stringer foot that is to be formed in opposed directions and thereby, first, producing a spreading and, thereafter, a folding open. Thereafter, the guiding function can also be taken over by the rotating, cylindrical areas.

In the following, the present invention is described in more detail with reference to the appended figures.

BRIEF DESCRIPTION OF THE DRAWINGS

FIG. 5 shows a method state of a method according to a further embodiment of the present invention.

DETAILED DESCRIPTION OF THE DRAWINGS

Figure 1:
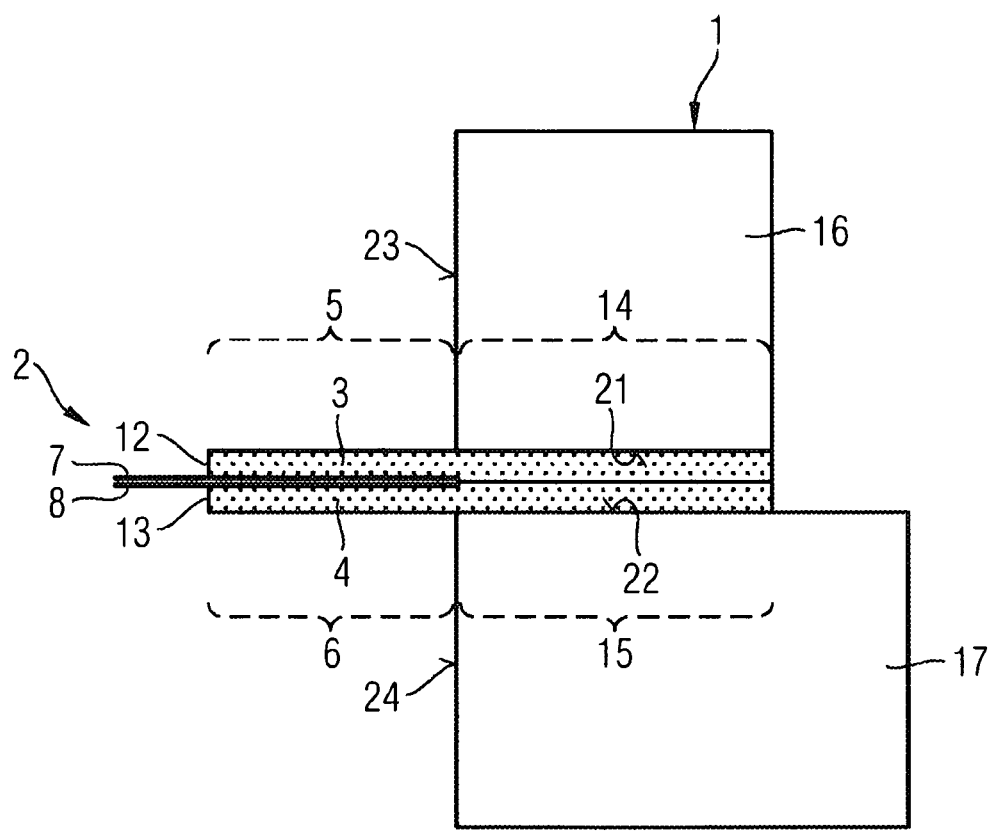
FIG. 1 shows a first method state of a method according to a first embodiment of the present invention.

In the figures, like reference numerals indicate like or functionally equivalent components, unless otherwise indicated.

FIG. 1 shows schematically a section through a clamping device 1 clamping a lay-up arrangement 2. The lay-up arrangement 2 comprises a first and a second lay-up strip 3 and 4, both preferably made of one or more layers of tape, in particular produced by means of an automatic tape laying machine.

Between areas 5 and 6 of the first and second lay-up strips 3 and 4 which are intended to form the stringer foot of the T-stringer to be produced, a first and a second separation film 7 and 8 are arranged. The first and second separation film 7, 8 prevent the areas 5 and 6 from sticking to one another. As understood later, the first and second separation films 7 and 8 also have the function of a positioning aid for the folding-open mandrel.

According to the present embodiment, the first and second separation film 7 and 8 project past edges 12 and 13 of the first and second lay-up strips 3 and 4. This measure also makes it easy to insert the folding open mandrel between the first and second separation film 7 and 8 as will be understood later.

Bordering on the areas 5 and 6, the first and second lay-up strips 3 and 4 have areas 14 and 15 which are intended to form the stringer web of the T-stringer that is to be produced. The areas 14 and 15 lie directly on top of each other.

The lay-up arrangement 2 shown in FIG. 1 can easily be built up on a suitable laminating apparatus (not shown) by means of laying lay-up strips 3 and 4 and the separation film 7 and 8 on top of one another. In principle, it is possible to additionally put so-called "blades" (not shown) made of fiber composite material between the areas 14 and 15 corresponding to the stringer web.

Thereafter, the lay-up arrangement 2, as shown in FIG. 1, is arranged inside the clamping device 1 such that the areas 14 and 15 are held between the clamping jaws 16 and 17. The clamping jaws 16 and 17 comprise clamping surfaces 21 and 22, respectively, between which the areas 14 and 15 are clamped and, substantially at right angles to the clamping surfaces 21 and 22, pressure surfaces 23 and 24 are provided. The areas 5 and 6 substantially project at right angles to the pressure surfaces 23 and 24.

Preferably, a pressure is exerted on the areas 14 and 15 by means of the clamping jaws 16 and 17 such that a material mixing between the areas 14 and 15 is achieved.

Presently, the transversal direction of the lay-up arrangement 2 and the clamping device 1 is indicated with X (see FIG. 2), the longitudinal direction of the lay-up arrangement 2 and a clamping device 1 is indicated with Y and the upwards direction of the clamping device 1 and the direction along the thickness of the lay-up arrangement 2 is indicated with Z.

Figure 2:
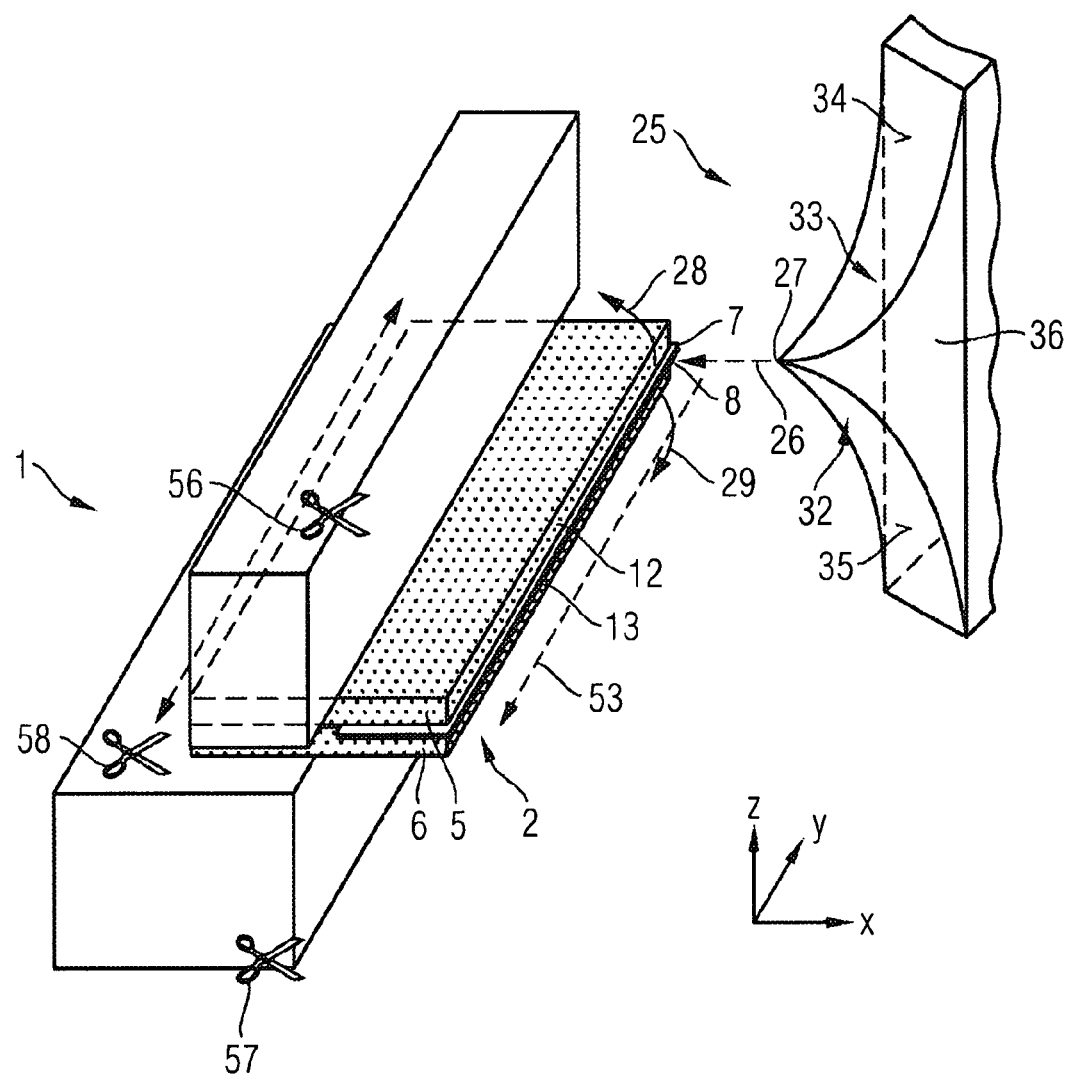
FIG. 2 shows a further method state according to the embodiment.

Then, in a further method step, as shown in FIG. 2, a folding-open mandrel 25 (the folding up mandrel 25 is shown in a state where it is turned about the Z-axis by approximately 45 degrees, and it is shown strongly enlarged) is moved in the direction of the arrow 26 (transversal direction X of the lay-up strips 3 and 4) towards the lay-up arrangement 2. The folding-open mandrel 25 preferably has a shape that tapers in a concave manner.

Preferably, the folding up mandrel 25 has basically the shape of a triangular cylinder 32 having a base area 33 that substantially extends in the X-Z-plane and is hidden in FIG. 2. The triangular cylinder 32 extends in the X-direction and has side surfaces 34 and 35 that taper in a concave manner in the X-Z-plane towards the tip 27. The top surface 36 of the triangular cylinder 32 runs skewed in the X-Y-plane, preferably bent in a convex manner, towards the tip 27.

Figure 3:
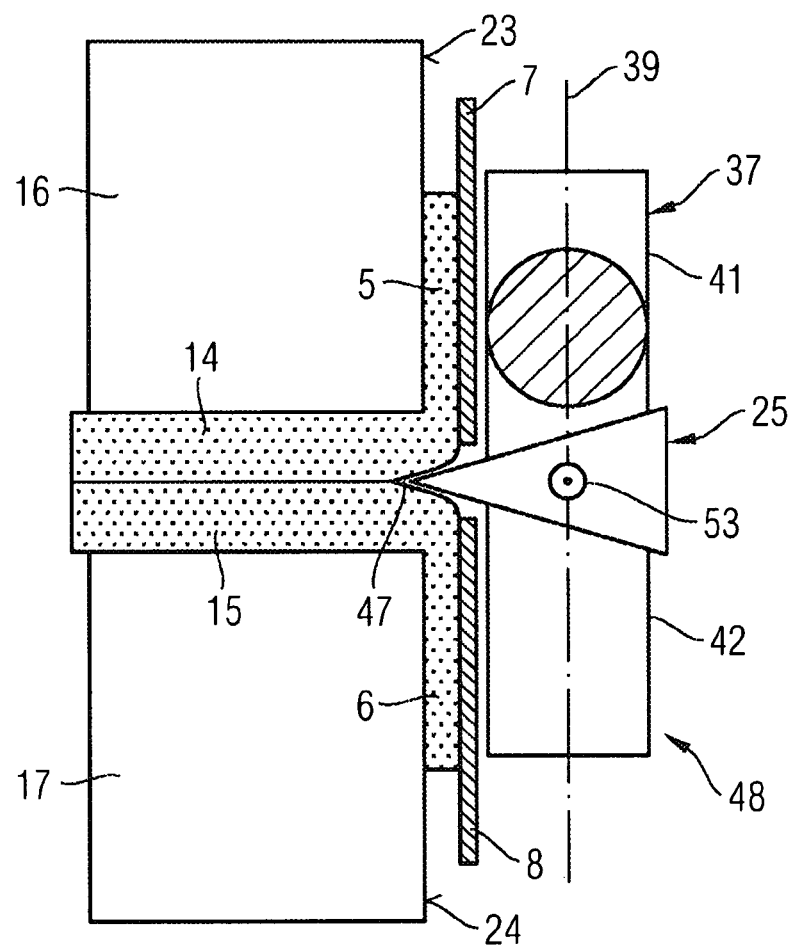
FIG. 3 shows an even further method state according to the embodiment.

By means of moving the folding open mandrel 25 toward the clamping device 1 (i.e. in the direction of the arrow 26) between the separation film 7 and 8, the edges 12, 13 of the lay-up strips 3 and 4 are folded along the side surfaces 34 and 35 more and more in opposite directions as indicated with the arrows 28 and 29 until a state as shown in FIG. 3 is reached, wherein the areas 5 and 6 have an angle of approximately 90 degrees with respect to the areas 14 and 15 and lie against the pressure surfaces 23 and 24 of the clamping jaws 16 and 17.

In FIG. 3, the folding-open mandrel 25 is shown in a simplified manner as compared to FIG. 2. Further, in FIG. 3 a pressing roller 37 is shown, which has two rotatable, cylindrical areas 41 and 42 that are arranged on the same axis 39. For clarity reasons, these are not shown in FIG. 2.

The folding-open mandrel 25 is positioned between the areas 41 and 42 such that it extends in the transversal direction X towards the clamping device 1 past the cylindrical areas 41 and 42.

By moving the pressing roller 37 in the direction of the arrow 26, the areas 5 and 6 are pressed against the pressing surfaces 23 and 24 and, thereby, a flush and even orientation of the same can be achieved. In the state shown in FIG. 3, the folding open mandrel 25 extends preferably into a region 47 of the lay-up arrangement where usually a gusset (not shown) is arranged.

The folding-open mandrel 25 and the pressing roller 37 are preferably designed as a unit 48 which can, for example, be attached of an arm of a robot, in particular of a portal type robot.

In a further method step, the unit 48 travels along the arrow 53 (see FIG. 2), whereby the areas 5 and 6 are folded open along their entire length (Y-direction) as shown in FIG. 3.

Preferably, during and/or prior to the folding open of the lay-up arrangement, heat is applied, in particular to the areas 5 and 6. This can, for example, be achieved by using appropriate solar radiators. Thereby, the lay-up strips 3 and 4 become flexible and can be easily deformed plastically.

Now, the separation films 7 and 8 can be removed in a further method step as they are not being required any further.

After the folding open of the areas 5 and 6 can be fixed in their position by means of film strips (not shown).

The folding open of the areas 5 and 6 results in the previously discussed book effect. Therefore, for example, in a further step, the edges 12 and 13 of the areas 5 and 6 and/or also the edges 54 and 55 of the areas 14 and 15 can be machined by means of cutting tools 56, 57 and 58. This is schematically shown in the FIGS. 2 and 4.

In a further method step, foot layers 59 can be positioned onto the areas 5 and 6, which then lie in one plane, i.e. flush, in order to enforce the stringer foot that is to be produced.

Figure 4:
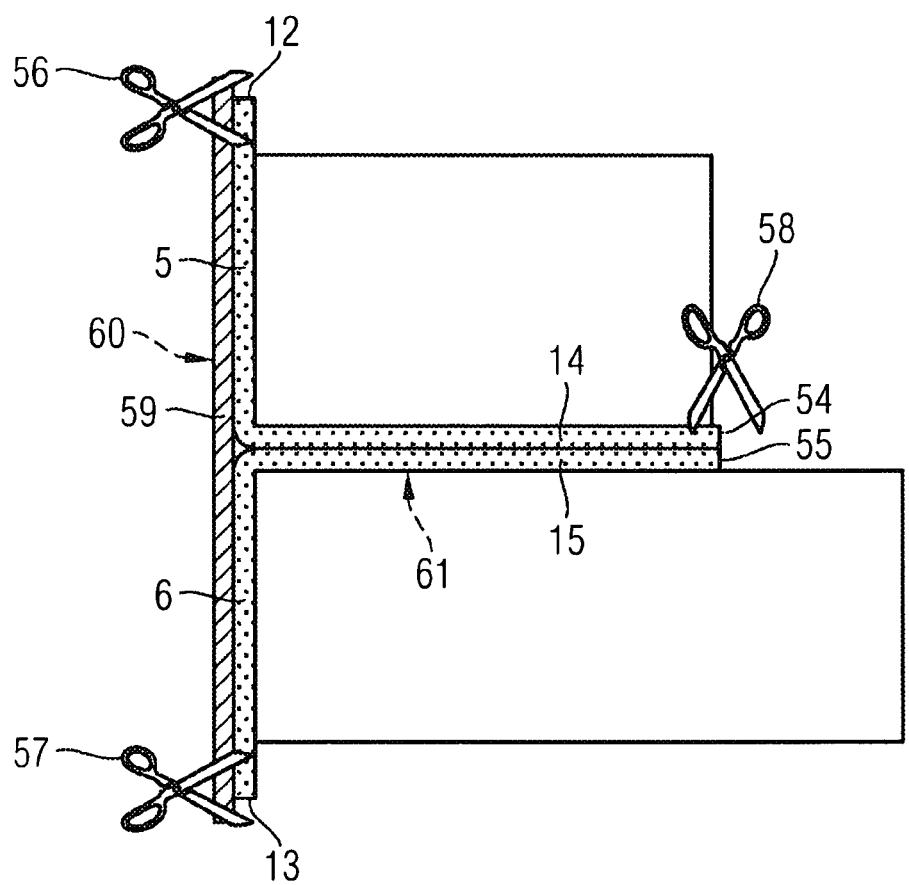
FIG. 4 shows an even further method state according to the embodiment.

Thereafter, the entire arrangement from FIG. 4 is sealed vacuum tight (not shown) and is cured under heat and/or pressure that is applied. The regions 60, 61 then form the stringer web and the stringer foot.

FIG. 5 shows a method state in a method according to a further embodiment of the present invention.

The state shown in FIG. 5 differs from the one in FIG. 1 in terms of the orientation of the lay-up arrangement 2 with respect to the clamping jaws 16 and 17. The angle 64 between the clamping surface 21 and the pressure surface 23 is smaller than 90 degrees, for example 60 degrees. Otherwise, the method corresponds to the one described with reference to the FIGS. 1 to 4.

Thereby, by means of the clamping device 1 according to the embodiment shown in FIG. 5, a T-stringer can be produced, which has a web that is orientated skewed with respect to the foot.

Even though the present invention has been described with reference to preferred embodiments, the present invention is not restricted to these but can be modified in numerous ways.

The present invention provides a method as well as a tool for producing a T-stringer, in particular in the aircraft and spacecraft sector. The method is characterized by two lay-up strips being arranged on top of one another, wherein areas of the lay-up strips corresponding to the stringer foot that is to be formed, are spaced apart from one another by means of separation films and areas of the lay-up strips corresponding to a stringer web come into direct contact with one another, in particular, forming a material bond. In a further method step, the lay-up strips are clamped at the areas corresponding to the stringer web that is to be formed. In an even further step, the areas corresponding to the stringer foot that is to be formed are folded open in opposite directions by means of a folding-open mandrel, and by means of a pressing roller the areas are pressed against corresponding pressing surfaces of the clamping device such that the areas are properly flush. Finally, the folded lay-up strips are cured to form the T-stringer that is to be produced. The method according to the invention has the advantage over the known method for producing T-stringers that a smaller number of steps is required to produce the T-stringer and can be automated easily.

The invention claimed is:

1. Method for producing a T-stringer, in the aircraft or spacecraft sector, comprising the following steps:
   providing a first and a second lay-up strip;
   positioning a first separation film onto an area of the first lay-up strip corresponding to a stringer foot of the T-stringer that is to be formed, wherein the first separation film borders on an edge of the first lay-up strip;
   positioning a second separation film onto an area of the second lay-up corresponding to the stringer foot, wherein the second separation film borders on an edge of the second lay-up strip;
   positioning the second lay-up strip onto the first lay-up strip such that an area of the second lay-up strip corresponding to a stringer web of the T-stringer that is to be formed lies against an area of the first lay-up strip corresponding to the stringer web and that the first and second separation films lie against each other;

folding the areas of the first and second lay-up strip corresponding to the stringer foot that is to be formed open in opposed directions, wherein the areas of the first and second lay-up strip, which correspond to the stringer web that is to be formed and which lie against each other, are clamped in a clamping device, wherein the areas of the first and second lay-up strip corresponding to the stringer foot project from the clamping device, and, thereafter, a folding-open mandrel is inserted between the first and second separation film for folding the areas of the first and second lay-up strip corresponding to the stringer foot open in opposed directions; and at least partially curing the first and second lay-up strip for producing the T-stringer.

2. Method according to claim 1, wherein the areas of the first and second lay-up strip, which correspond to the stringer foot that is to be formed and which are folded open, are pressed by means of a pressing roller moving in the longitudinal direction of the lay-up strips, against a surface of the clamping device, respectively, and lie flush with respect to each other.

3. Method according to claim 1, wherein directly after the folding open or after the pressing against the surfaces of the clamping device, the first and second separation film are removed.

4. Method according to claim 1, wherein the areas of the first and second lay-up strip, which correspond to the stringer foot that is to be formed and which are folded open, are machined prior to the at least partial curing.

5. Method according to claim 1, wherein the first and second lay-up strip are provided as prepreg material or dry fiber preforms.

6. Method according to claim 5, wherein the dry fiber preform is impregnated with a matrix after the folding open.

* * * * *